May 26, 1931.  G. C. WOODRUFF  1,807,268
CONTAINER FREIGHT CAR
Filed April 30, 1929  2 Sheets-Sheet 1
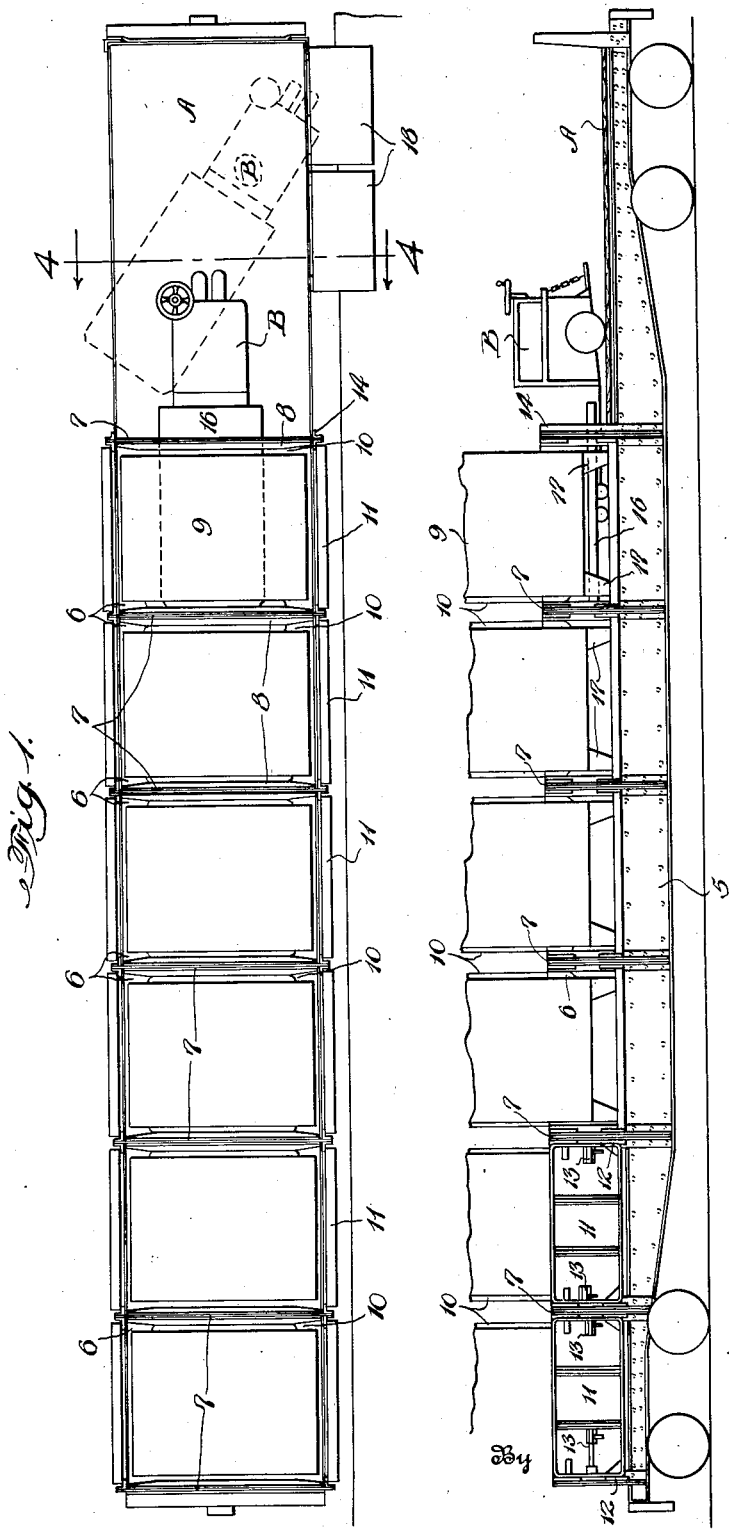

May 26, 1931. G. C. WOODRUFF 1,807,268
CONTAINER FREIGHT CAR
Filed April 30, 1929 2 Sheets-Sheet 2
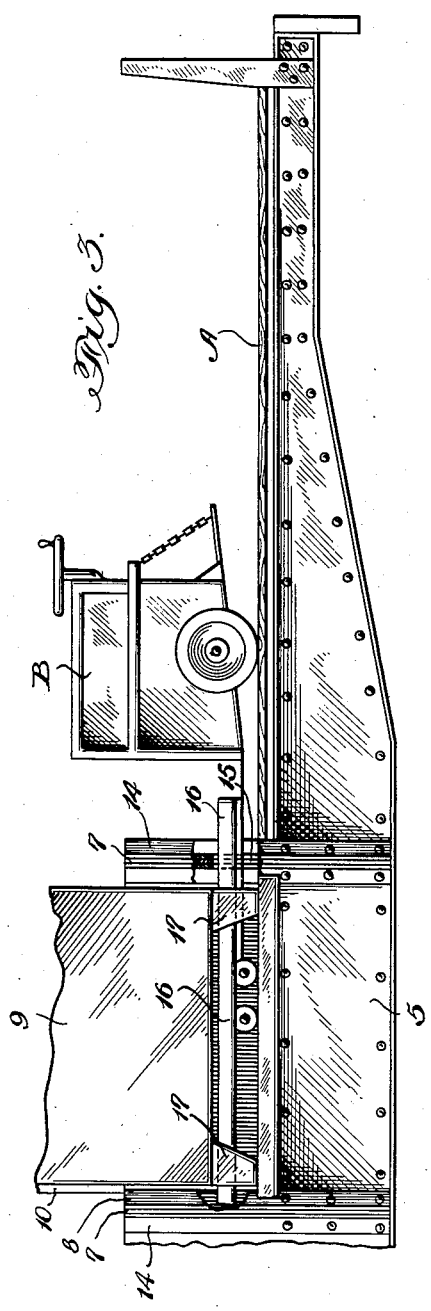
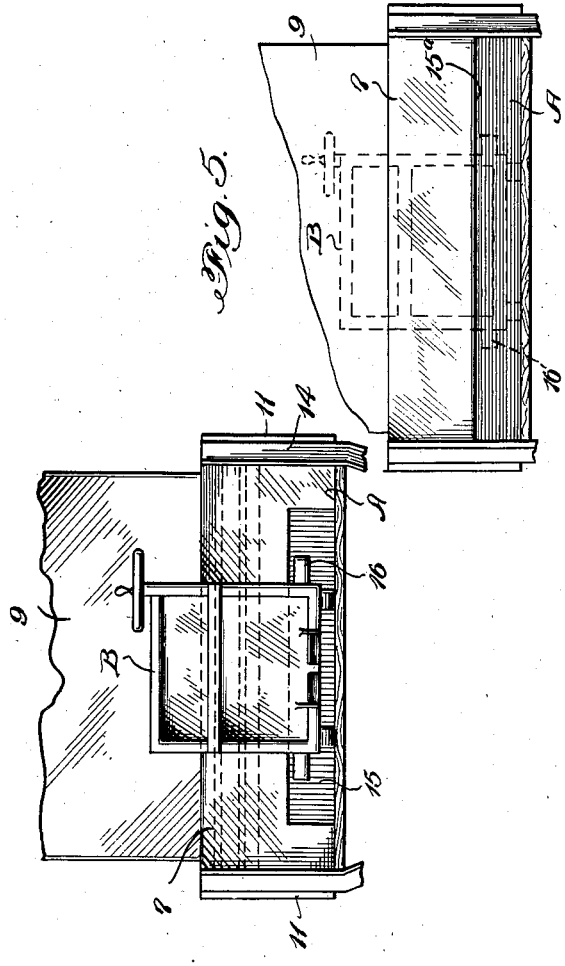
Inventor
Graham C Woodruff
By [signature]
Attorney Patented May 26, 1931

1,807,268

UNITED STATES PATENT OFFICE

GRAHAM C. WOODRUFF, OF BRONXVILLE, NEW YORK, ASSIGNOR TO THE L. C. L. CORPORATION, A CORPORATION OF DELAWARE

CONTAINER FREIGHT CAR

Application filed April 30, 1929. Serial No. 359,392.

The container, or sectional freight car, system disclosed in the patents granted to Alfred H. Smith, see for instance Re. No. 16073, to facilitate loading and unloading of containers at points along the railroad lines has been generally adopted because of the many decided advantages resulting therefrom, among which may be named reduction to the railroad in the expense of handling less than car load lots of merchandise, security from theft during transportation and quicker delivery, all of which results in a benefit both to the shipper and consignee.

The object of my invention is to provide a car so constructed that the container may be loaded on, or removed from the car at all stations on the railway system without the use of an overhead crane with which many stations are not equipped; and with these and other objects in view my invention consists of the parts and combination of parts hereinafter pointed out.

In the drawings:

Figure 1 is a top plan view of a car and equipment embodying my invention.

Figure 2 is a side elevation of the same with some of the side doors removed.

Figure 3 is an enlarged detail side elevation of one end of the car, container and truck on the car.

Figure 4 is a cross sectional view of the car on the line 4—4, Figure 1, looking in the direction of the arrows, the under frame and side doors being omitted.

Figure 5 is a view similar to Figure 4 showing another embodiment of my invention.

The reference numeral 5 designates a car of the general type shown in my application, Serial No. 354,636, filed April 12, 1929, divided into compartments 6 by means of transverse partitions, or bulkheads 7, which are provided with container guides 8, which center the containers 9 as they are being loaded and unloaded into the compartments 6 and also function to hold the containers on the car from shifting while en route. These containers are provided with doors 10, of approved type, and the containers are loaded on the car in such manner that its door is opposite one of the bulkheads 7 so that it will be impossible to open the door of the container so long as it is on the car, thereby preventing pilfering of the containers while en route.

At each end of each compartment 6 I provide drop sides, or doors, 11, some of which, for purposes of illustration, are omitted in Figures 2 and 3, said doors being secured to the car, at the bottom, by means of hinges 12, or in any other desired manner, so long as they are free to be dropped or swung down to open the end of the compartment; the door being provided with a suitable lock 13.

At the ends of the bulkheads 7 I secure on each side thereof angle irons 14 which function as side stakes or posts and rigidify the ends of the bulkheads and these angle irons are also riveted to the side sills of the car as shown in Figures 2 and 4.

I provide an uninterrupted space or truck supporting and maneuvering platform at one end of the car which I have designated by the letter A, either by omitting some of the bulkheads in a standard length car, or I may provide this space by proportionately increasing the length of the car, said space or platform being provided for transporting on the car and having available at all times a lift truck B, which can be readily loaded on and removed from the car at any station when required for handling containers on or off the same car, or any other car similarly equipped with drop sides to permit loading and unloading containers by this means. Suitable means, not shown, may be provided for blocking the wheels of the truck in position on the car while en route to prevent it from shifting on the car.

It is desirable to reduce to a minimum additional length to a car for the purpose of providing storage space for a truck on the car, therefore I have provided a port, passageway, or opening 15 through the bulkhead 7 adjacent the truck space A, said opening being at the bottom of the bulkhead and of sufficient width and height to permit of the lifting platform 16 of the truck to easily pass through it, as shown in the drawings, whereby the lifting platform 16 of the truck for the major portion of its length is stowed in the bottom of the compartment next adjacent to said platform A and under the body of the container disposed therein. In this connection it will be seen that I have provided the containers with legs 17 which elevate the body of the container above the car floor. Containers without legs may be used providing suitable supports therefore are provided either on the car floor or on the bulkheads to suspend the containers a sufficient distance above the car floor to permit of the platform 16 of the truck being stowed beneath the containers.

Gang planks 18 are carried with the car and are used between the car and station platform over which the truck moves to and from the space A, and these gang planks may also be attached to the car opposite each compartment to facilitate loading and unloading the containers. These gang planks may be positioned upright, when not in use, and function as sides for the car at the space A.

From Figure 1 it will be noted that the length of the clear space or platform A is so proportioned relatively to the length of the lifting truck, that, after the lifting platform 16 of the truck has been entirely withdrawn from under the container and beyond the bulkhead 7, there is ample room for the truck to swing around in the space A sufficiently for it to move off the car.

Due to the construction described, I am enabled to load and unload the containers, and carry a lifting and conveying truck for the containers on the same car without unduly lengthening the car by reason of the stowing of the lift platform of the truck under a container body; this method of loading and unloading a car entirely eliminates the necessity of using overhead cranes, and adapts the car for loading and unloading at all stations whether they have a crane or not, which is an important consideration because the majority of stations are not equipped with overhead cranes, because of the high cost of such cranes; another consideration is that shippers and consignees at smaller stations can by the use of my invention avail themselves of the material advantage of using the container service.

In using my invention mixed consignments can be handled from point of origin to numerous destinations on a container basis, rather than on a box car basis; that is to say, load in one container car, say, six or seven containers, with consignments to separate points so that the container car, when ready to run, would have each container for a different destination, loaded with 5,000 up to 10,000 pounds. This would mean that the car would stop at first destination, the container removed by the truck, and if there was an empty or loaded container available, it would be loaded on the car. It will also be obvious that by my method and construction containers could be left out at the desired stations in the middle of the night with no necessity for the station being open, and the contents kept fully as safe as freight in the station warehouse, because each container is a warehouse in itself. This will mean in actual operation the saving of a very considerable number of box cars, both as an investment, maintenance, operation over the road, yard switching, and what is more important, the saving of station house track space, which is often at a great premium and impossible to increase, except at a prohibitive expense at the larger terminals.

It, of course, is obvious that instead of cutting the opening 15 in the bulkhead, I may make the bulkhead of such width that when in assembled position its bottom edge 15a will be spaced a sufficient distance above the car floor to permit the platform 16 of the truck to pass under it as shown in Figure 5.

What I claim is:

1. A container car comprising a body, bulkheads disposed in spaced relation transversely of the body to form a series of container compartments, one of the end compartments of the series terminating a distance inwardly from one end of the car to provide an uninterrupted floor space beyond said bulkhead and between the same and said end of the car, said bulkhead having a passage communicating with said space, whereby the platform of a lifting truck may be inserted through said passage and stowed under a container in the said compartment next adjacent the said floor space.

2. In combination, a car having a platform portion, a plurality of freight containers removably mounted on the car, and a lift truck on said platform portion having its lifting platform stowed beneath one of the containers.

3. A car having a compartment for the reception of a removable container, and platform space for a lifting truck adjacent to the compartment, a passageway being provided between said compartment and platform space through which a portion of the truck may be inserted for stowage in said compartment.

4. A car having a compartment for a removable container and a platform space for a lifting truck adjacent to the compartment, and a container constructed to be received in said compartment and supported therein with its bottom elevated above the bottom of the compartment, a passageway being provided between said compartment and platform space through which the lifting platform portion of the truck may be inserted for stowage in the space between the elevated bottom of the container and the bottom of the compartment.

5. In a container car, a car body having a longitudinally extending series of container receiving compartments terminating short of one end of the car, said end of the car being provided beyond the adjacent end compartment of the series with a lifting truck receiving space, there being a connecting passage between said space and said end compartment through which the platform of the truck may be inserted so as to be stowed in the compartment beneath a container therein.

6. A car having a longitudinal series of container compartments terminating short of one end of the car, and a platform at the latter-named end of the car on which a container lifting and transporting truck may be supported for limited travel longitudinally of the car and steered so as to be turned to run on and off the platform transversely of the car.

7. A car having a longitudinal series of compartments for removable containers, one of the end compartments of the series terminating short of one end of the car, a platform at such end of the car for supporting a container lifting and transporting truck, movable on said platform longitudinally and transversely of the car, and a wall at a side of the platform adapted to be disposed to form a gangway over which the truck may travel to and from the platform.

8. A car having a longitudinal series of removable container compartments terminating short of one end of the car, a platform at the latter-named end of the car for supporting a container lifting and transporting truck, adapted to be moved longitudinally and transversely of said platform, and walls at opposite sides of the platform, either adapted to be disposed in a position to form a gangway for the travel of the truck thereon to and from the platform.

9. A container car having a longitudinal series of removable container compartments terminating short of one end of the car, a platform at the latter-named end of the car for supporting container lifting and transporting truck adapted to be moved longitudinally and transversely of the platform, the container compartment lying adjacent to said platform having a passage connecting it with the paltform space, whereby the platform portion of the truck may be inserted for stowage into said compartment, and a wall at the side of the platform adapted to be disposed to form a gangway for the travel of the truck thereover to and from the platform.

10. A car having a longitudinal series of removable container compartments terminating short of one end of the car, a platform at the latter-named end of the car to support a container lifting and transporting truck adapted to be moved longitudinally and transversely of the platform, the compartment lying next to said platform being provided with a passage connecting it with the platform space, whereby the platform portion of the truck occupying the platform may be inserted through the passage into said compartment for stowage therein, and walls at opposite sides of the platform either of which is adapted to be disposed to provide a gangway over which the truck may travel to and from the platform.

11. A car having a row of receiving spaces for removable containers and a platform for supporting a container lifting and transporting truck, and containers in said spaces, the container in the space next adjacent to said platform having an elevated bottom forming a storage chamber between it and the bottom of the receiving space, said chamber being exposed to the platfrom space so that a portion of the truck resting upon the platform may be inserted into said storage chamber beneath said container.

12. A container car having a body, a longitudinal series of removable containers mounted on the body, and a floor space on the body next adjacent one of the end containers of the series providing storage and turning space for a lifting truck on the car.

13. A container car comprising a body, a longitudinal series of removable containers on the body, means between the containers for holding them from relative displacement, and a platform on the body next adjacent an end container of the series providing storage and turning space for a lifting truck on the car.

14. The combination with a car, of a freight container removably mounted on the car, a truck supporting platform portion being provided on the car between one end of the car and the container, and a lifting truck on said platform portion.

15. The combination with a car, of a plurality of bulkheads transversely disposed in spaced relation on the car to form a series of container compartments, the car having an uninterrupted floor space at one of its ends beyond one of the end compartments of the series, removable containers in said compartments supported from the floors of the compartments but having their bottoms elevated above the floors of the compartments, and the bulkhead between said floor space and said end compartment having its lower edge spaced from the floor of the car so as to provide an intervening passage through which the platform of a lifting truck may be projected from said space to extend under the elevated bottom of the container in the adjacent end compartment.

In testimony whereof I affix my signature.
GRAHAM C. WOODRUFF.